(12) United States Patent
Liang et al.

(10) Patent No.: US 10,768,091 B2
(45) Date of Patent: Sep. 8, 2020

(54) PARTICLE COUNTING METHOD AND SYSTEM

(71) Applicants:JIANGSU SUJING GROUP CO., LTD, Suzhou, Jiangsu (CN); SUJING GROUP AUTOMATION INSTRUMENT EQUIPMENT CORPORATION, Suzhou, Jiangsu (CN)

(72) Inventors: Fengfei Liang, Jiangsu (CN); Jiyong Sun, Jiangsu (CN); Weidong Shen, Jiangsu (CN); Danong Zhou, Jiangsu (CN); Jian Chen, Jiangsu (CN)

(73) Assignees: Jiangsu Sujing Group Co., Ltd, Suzhou (CN); Sujing Group Automation Instrument Equipment Corporation, Suzhou (CN)

( * ) Notice: Subject to any disclaimer, the term of this patent is extended or adjusted under 35 U.S.C. 154(b) by 0 days.

(21) Appl. No.: 16/339,817

(22) PCT Filed: Apr. 11, 2018

(86) PCT No.: PCT/CN2018/082628
§ 371 (c)(1),
(2) Date: Apr. 5, 2019

(87) PCT Pub. No.: WO2018/188603
PCT Pub. Date: Oct. 18, 2018

(65) Prior Publication Data
US 2020/0049615 A1 Feb. 13, 2020

(30) Foreign Application Priority Data
Apr. 12, 2017 (CN) .......................... 2017 1 0235740

(51) Int. Cl.
*G01N 15/14* (2006.01)

(52) U.S. Cl.
CPC . *G01N 15/1434* (2013.01); *G01N 2015/1486* (2013.01)

(58) Field of Classification Search
CPC ................... G01N 15/1434; G01N 2015/1486
(Continued)

(56) References Cited

U.S. PATENT DOCUMENTS 5,561,515 A * 10/1996 Hairston .................. G01P 5/22
356/28
7,847,923 B2 * 12/2010 Pittaro ................... G01N 15/14
356/28
(Continued)

FOREIGN PATENT DOCUMENTS

CN 202994624 U 6/2013
CN 103940707 A 7/2014
(Continued)

OTHER PUBLICATIONS

International Written Opinion for Application No. PCT/CN2018/082628, dated Jul. 5, 2018.
International Search Report for Application No. PCT/CN2018/082628, dated Apr. 11, 2018.

*Primary Examiner* — Roy M Punnoose
(74) *Attorney, Agent, or Firm* — Kramer Levin Naftalis & Frankel, LLP (57) ABSTRACT

The present disclosure relates to a particle counting method and system. The particle counting method, comprises: obtaining distances between positions closest to a centers of a light channel in paths along which particles pass through the light channel and the centers of the light channel; according to an optical density distribution of the light channel, compensating amplitudes of the pulse signals of the particles when passing through the positions closest to the centers of the light channel in the path along which the particles pass through the light channel such that the com-
(Continued)

pensated amplitudes of the pulse signals of the particles are equal to amplitudes of pulse signals of the particles with the same particle diameters when passing through the centers of the light channel; screening and counting the particles according to the compensated amplitudes of the pulse signals to realize counting of particles with respective particle sizes.

13 Claims, 5 Drawing Sheets

(58) Field of Classification Search
USPC .......................................................... 356/336
See application file for complete search history.

(56) References Cited

U.S. PATENT DOCUMENTS

| | | | |
|---|---|---|---|
| 9,638,622 B2* | 5/2017 | Tahara | G01N 15/1429 |
| 2008/0221812 A1* | 9/2008 | Pittaro | G01N 15/14 |
| | | | 702/66 |
| 2011/0063602 A1* | 3/2011 | Pittaro | G01N 15/14 |
| | | | 356/28 |
| 2015/0077860 A1 | 3/2015 | Pochy et al. | |

FOREIGN PATENT DOCUMENTS

| | | |
|---|---|---|
| CN | 106950162 A | 7/2017 |
| CN | 206710275 U | 12/2017 |
| JP | 11-237329 | 8/1999 |
| JP | 2009030988 A | 2/2009 |

\* cited by examiner

PARTICLE COUNTING METHOD AND SYSTEM

CROSS REFERENCE TO RELATED APPLICATION

The present application claims the priority of Chinese patent application CN 201710235740.7, filed on Apr. 12, 2017, which is hereby incorporated herein by reference in its entirety.

TECHNICAL FIELD OF THE INVENTION

The present disclosure belongs to the field of particle optical detection, and in particular, relates to a particle counting method and system.

BACKGROUND OF THE INVENTION

Optical particle counters are currently the primary detection tool for most industrially controlled particle contamination. Classifying by particle sizes, particles includes 5 μm particles, 2 μm particles, 1 μm particles, 0.5 μm particles, 0.2 μm particles, 0.1 μm particles, 0.05 μm particles, and even smaller, nano-sized particles.

Figure 1:
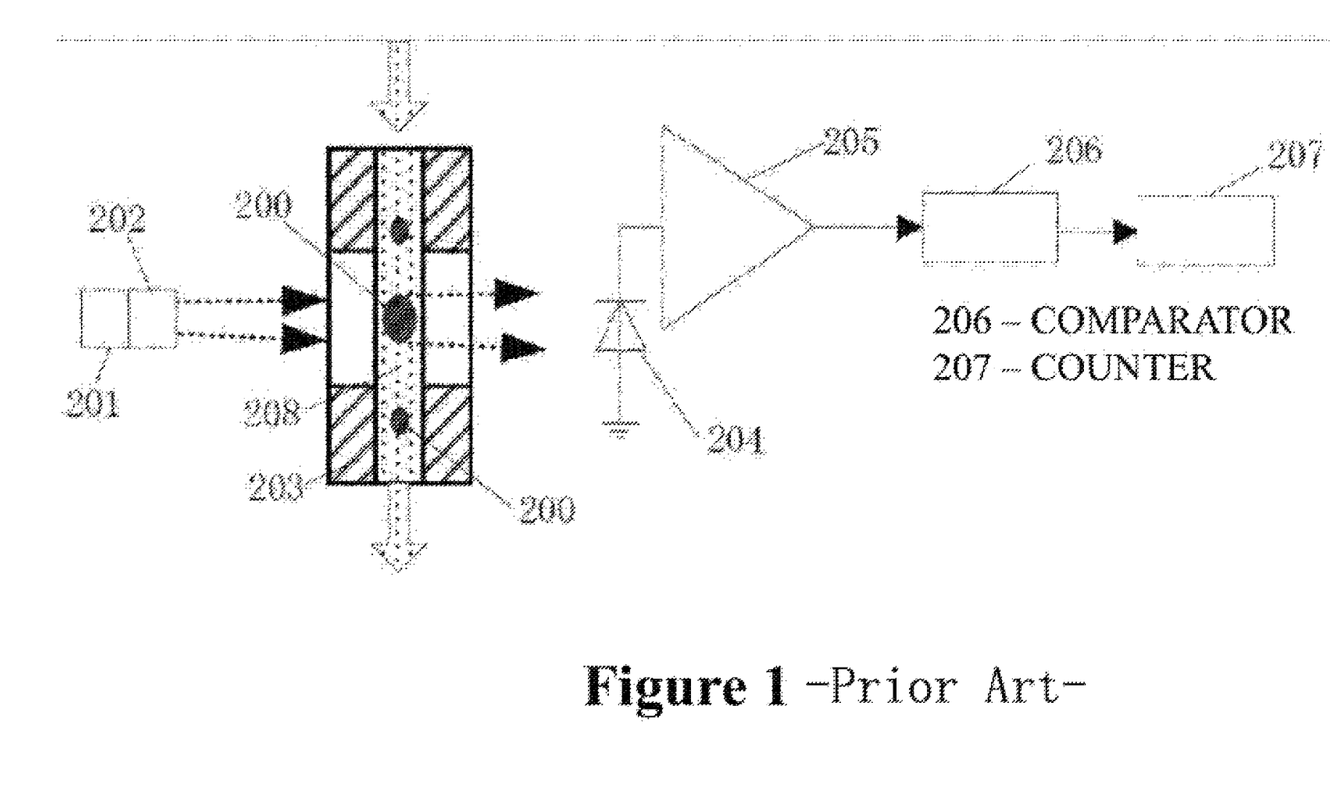
FIG. 1 is a schematic structure diagram of an existing particle counting system.
Figure 2:
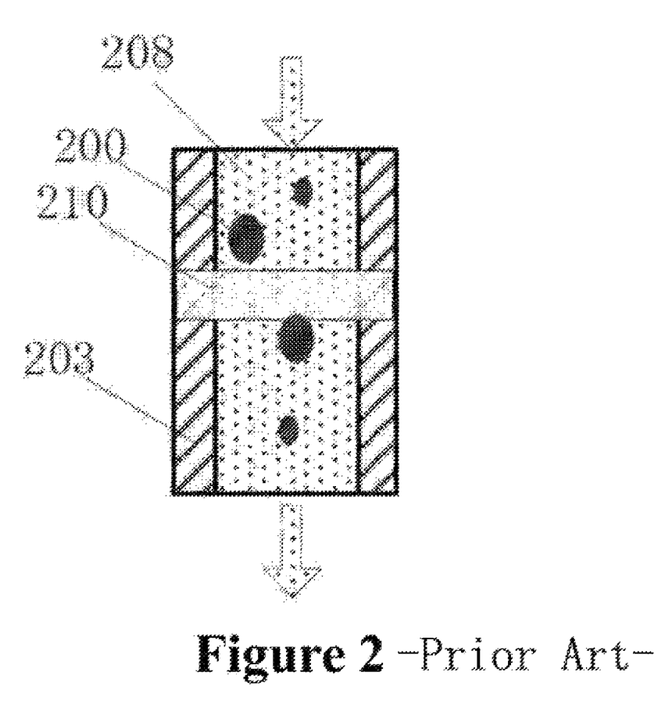
FIG. 2 is a schematic diagram of a light spot formed on the flow cell in the existing particle counting system.
Figure 3:
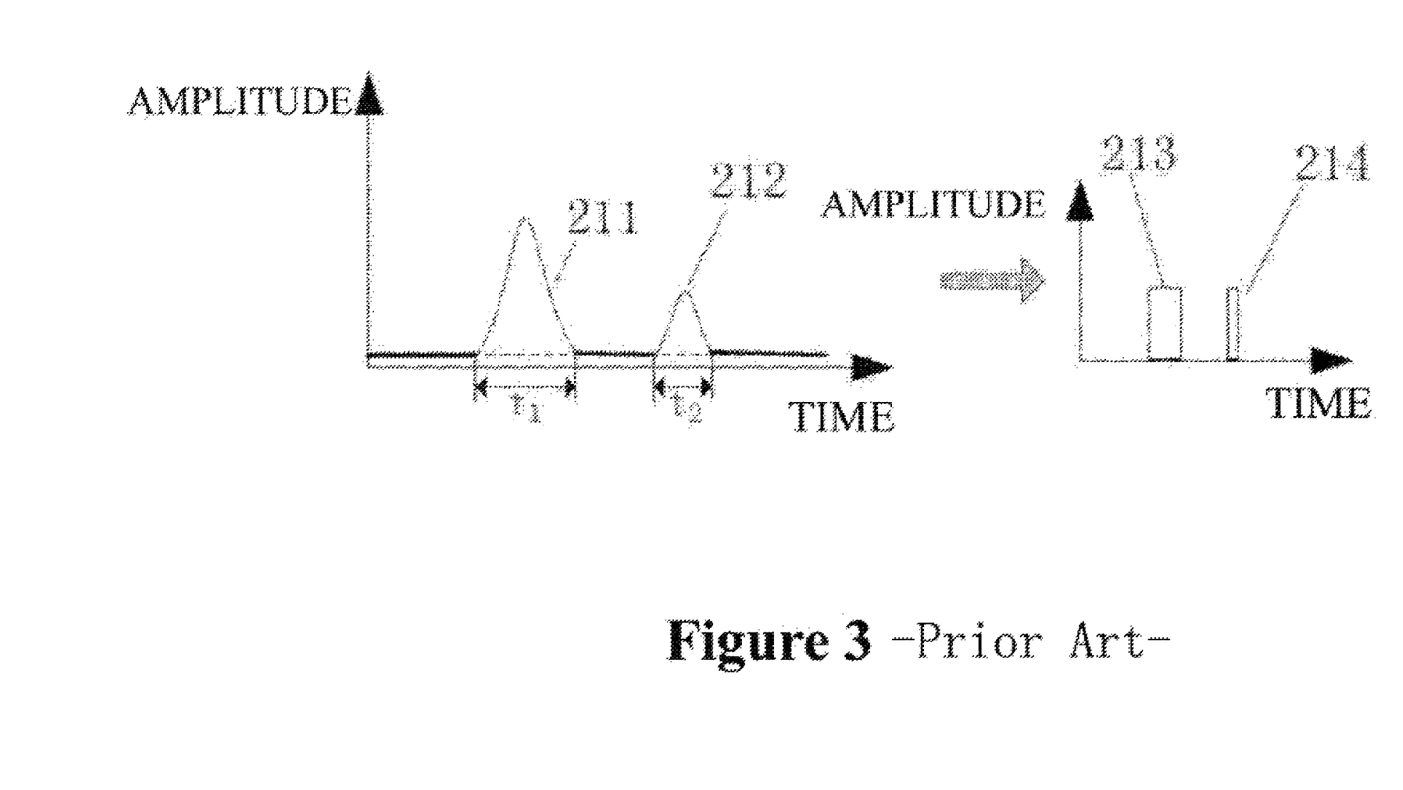
FIG. 3 is a schematic diagram of signal conversion of the existing particle counting system.

Optical particle counters currently used to detect micron-sized particles (above 2 μm) are based on the principle of the light blockage method. As shown in FIGS. 1 and 2, the existing light-blockage particle counter comprises a light source 201, an optical component 202, a flow cell 203, a photoelectric detector 204, a preamplifier 205, a comparator 206, and a counter 207. By means of the optical component 202 (including a convex lens, a cylindrical mirror, etc.), the circular spot generated by the light source 201 is converted into a line spot to be irradiated on the flow channel 208 within the flow cell 203, thereby forming a linear detection area 210, and then when the particles 200 pass through the detection area, scattered light is generated to be irradiated on the photoelectric detector 204 to generate current pulse signals 211 and 212 having different amplitudes and pulse widths, and then the current pulse signals are converted into voltage pulse signals via the preamplifier 205, and then into digital signals 213 and 214 via the comparator 206, which are input into the counter 207, and the counter 207 screens and counts the pulse signals according to the amplitudes of the pulse signals. FIG. 3 is a view showing a pulse signal scattered by particles passing through the detection area 210 in the flow cell 203 obtained by the existing particle counting system based on the light blockage method, which visually shows the conversion process of optical signals to electrical signals during the particle detection process in the light-blockage particle counter system.

The existing light-blockage particle counter converts the light emitted by the light source into a line light source through the optical component, and the main purpose thereof is to make the light source distribute uniformly in the detection area, thereby ensuring the sensitivity and resolution of the detection. However, the optical structures of the existing optical particle counter and system are relatively complicated, have a low light source utilization rate, and only can utilize a part of the light beam converted by the optical module in the light source.

The optical particle counter for detecting sub-micron-sized and nano-sized particles (below 1 μm) is based on the principle of light scattering, and generally adopts a circular spot, which can improve the utilization rate of the light source, increase the scattered light intensity of the particles, and improve the sensitivity of the system. However, due to the uneven distribution of the optical density of the light source spot, the resolution and sensitivity of the system on particles are greatly reduced, which seriously affects the test accuracy of the system.

SUMMARY OF THE INVENTION

An objective of the present disclosure is to provide a particle counting method with strong universality, and high sensitivity and resolution.

Another objective of the present disclosure is to provide a particle counting system with a simple light path structure, and high sensitivity and resolution.

To achieve the above purposes, a technical solution employed by the present disclosure is as follows:

A particle counting method, comprises:

S1) generating a light channel for detecting particles;

S2) acquiring optical signals scattered by the particles passing through the light channel and converting the optical signals into pulse signals;

S3) according to the pulse signals, obtaining distances between closest positions which are closet to center of the light channel in paths along which the particles pass through the light channel and the center of the light channel;

S4) according to an optical density distribution of the light channel, compensating amplitudes of the pulse signals of the particles when passing through the closest positions such that the compensated amplitudes of the pulse signals of the particles are equal to amplitudes of pulse signals of particles with same particle diameters when passing through the center of the light channel;

S5) screening and counting the particles according to the compensated amplitudes of the pulse signals to realize counting of the particle with respective particle sizes.

Specifically, the light channel is perpendicular to paths through which the particles flow, and an optical density of the light channel is normally distributed in a section perpendicular to the paths through which the particles flow.

Specifically, the pulse signals are voltage pulse signals.

Further, S3) comprises:

Obtaining flow times of the particles passing through the light channel according to pulse widths of the voltage pulse signals due to that pulse widths of pulse signals are correlated with times that the particles pass through the light channel;

Obtaining flow paths of the particles flowing through the light channel according to flow velocities and the flow times of the particles;

Calculating first distances between closest positions to a center of the light channel, positions closest to the center of the light channel in the flow path are the closest positions.

Further, S4) comprises:

pulse voltage amplitudes of the particles at the closest positions are initial pulse voltage amplitudes, and pulse voltage amplitudes of the particles at the closest positions after compensation are compensated pulse voltage amplitudes; calculating, according to the distances and an optical density distribution function, compensation coefficients of the initial pulse voltage amplitudes required to be compensated according to the distances and an optical density distribution function, wherein the initial pulse voltage amplitudes are pulse voltage amplitudes of the particles at the closest positions;

obtaining the compensated pulse voltage amplitudes of the particles according to the compensation coefficient, wherein the compensated pulse voltage amplitudes are pulse voltage amplitudes of the particles at the closest positions after compensation.

The present disclosure further employs the following technical solution:

A particle counting system, utilizing the foregoing particle counting method, comprises:

a light source module for generating a light beam for detecting the particles;

a flow cell module having a flow channel through which the particles flows, the light beam being irradiated on the flow channel to form a light channel at the flow channel for detecting the particles;

an optical signal collecting and processing module configured to acquire scattered optical signals formed by the particles passing through the light channel, to convert the scattered optical signals into corresponding pulse signals, to compensate the pulse signals, and to screen and count the pulse signals.

Further, the light source module comprises a semiconductor laser for generating a laser beam irradiated on the flow channel to form the light channel at the flow channel which is perpendicular to the flow channel.

Further, the light source module further comprises a collimating lens disposed between the semiconductor laser and the flow cell module, and the laser beam is collimated by the collimating lens and then is irradiated on the flow channel to form a cylindrical light channel on the flow channel, and an optical density of the light channel is normally distributed.

Specifically, the optical signal collecting and processing module comprises a photoelectric detector, a preamplifier, an Analog to Digital converter sampling unit, and a micro control unit connected in sequence, the photoelectric detector is used to convert the optical signals scattered by the particles into current pulse signals;

The preamplifier is used to convert the current pulse signals into voltage pulse signals;

The Analog to Digital converter sampling unit is used to convert the voltage pulse signals into digital signals;

The micro control unit is used to compensate, to screen and to count the digital signals.

Further, the photoelectric detector has a photodiode or a photomultiplier.

The above-mentioned orientation words, such as front, back, left, and right, are defined in terms of the orientation of the particle counting system during normal use.

The scope of the present disclosure is not limited to technical solutions specifically combined by the above technical features, and should encompass other technical solutions formed by any combination of the above technical features or the equivalent features thereof. For example, the technical solutions are formed by substituting between the above technical features and (but not limited to) the technical features with similar functions disclosed by the present disclosure.

Due to the use of the above technical solutions, the present disclosure has the following advantages over the prior art: The optical density of the particle entering the light channel at any angle is compensated to be equivalent to the optical density obtained at the center of the light channel, which ensures the pulse signal corresponding to the particle is only related to the particle size of the particle, and thus the particles with different particle sizes can be screened and counted according to the pulse signals. The particle counting method of the present disclosure has strong universality and high utilization of the light source, and greatly improves the sensitivity and resolution of the detection. The particle counting system of the present disclosure has a simple optical path structure, uniformly distributes the optical density of the light channel without complicated light paths, which reduces the processing difficulty of the flow cell.

Wherein, 1—light source module; 2—flow cell module; 3—optical signal collecting and processing module; 21—flow channel; 31—photoelectric detector; 32—preamplifier; 33—Analog to Digital converter sampling unit; 34—micro control unit; 101—light channel; 102—closest position; 103—optical density distribution curve; 104—center.

DETAILED DESCRIPTION OF EXEMPLARY EMBODIMENTS

Figure 4:
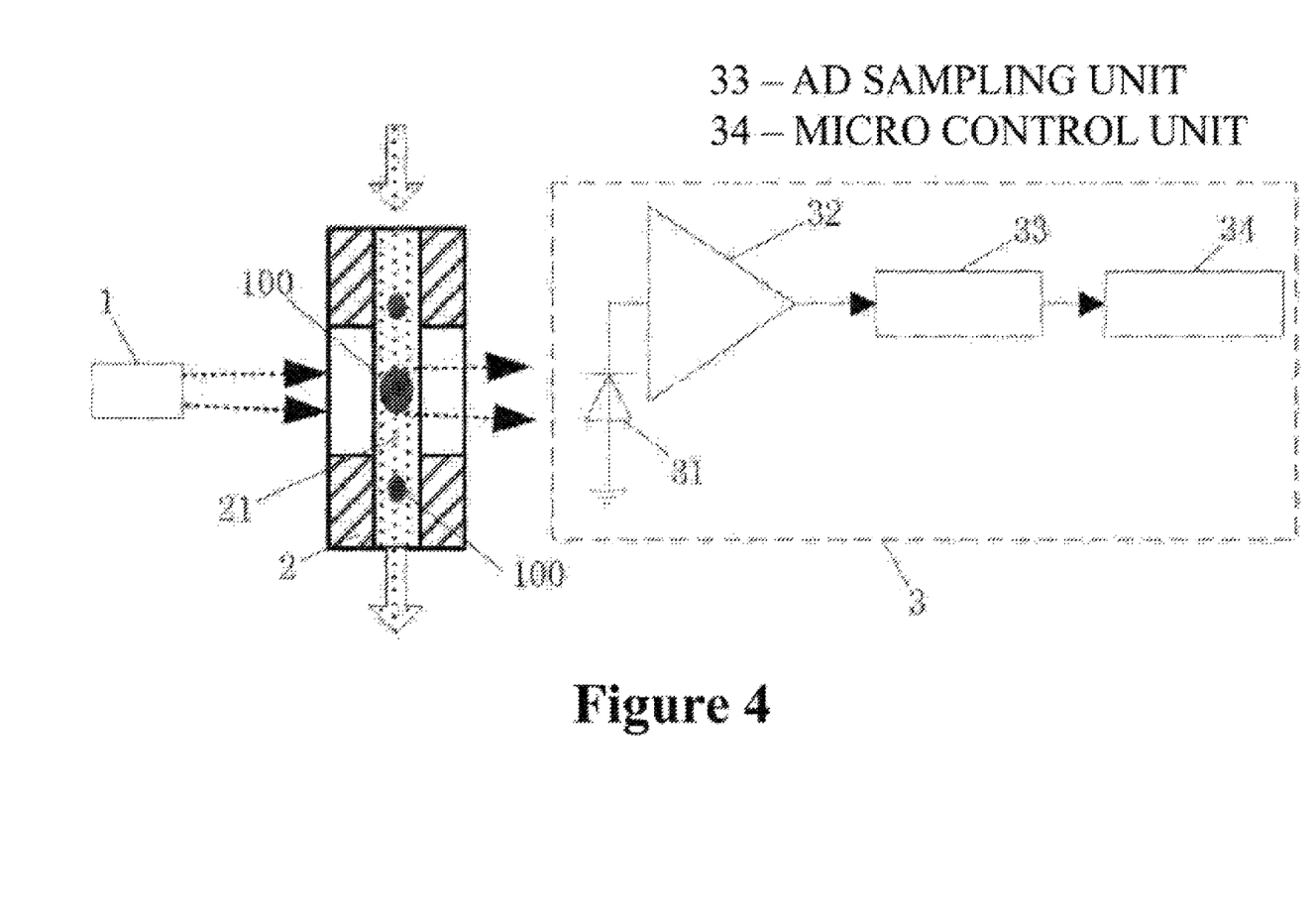
FIG. 4 is a schematic structure diagram of a particle counting system of the present disclosure.
Figure 5:
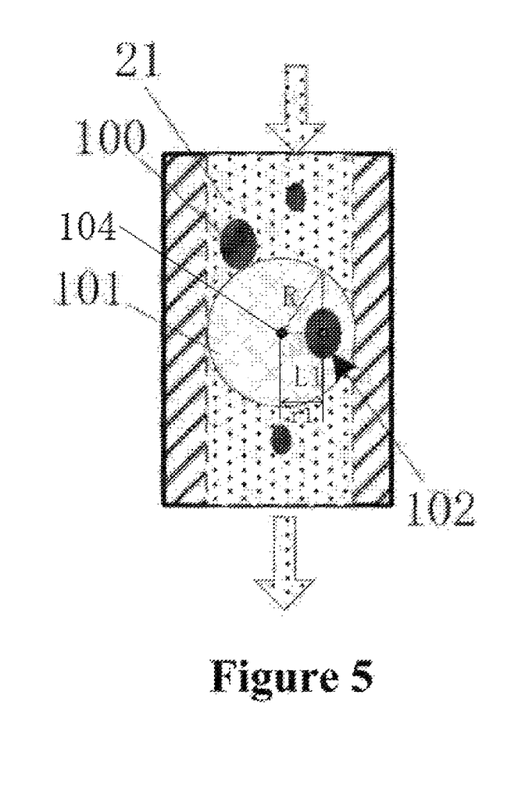
FIG. 5 is a schematic diagram of a light spot formed on the flow cell in the particle counting system of the present disclosure.
Figure 6:
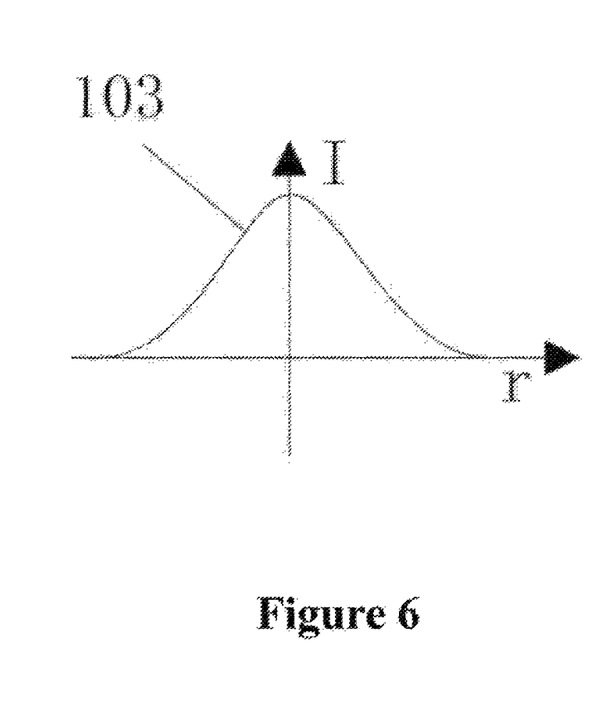
FIG. 6 is a schematic distribution diagram of the optical density of the light channel formed by the particle counting system of the present disclosure.

As shown in FIG. 4 to FIG. 6, a particle counting system of the present disclosure, comprises:

a light source module 1, the light source module 1 is for generating a light beam for detecting the particles 100;

a flow cell module 2, the flow cell module 2 has a flow channel 21 through which the particles 100 flow, the light beam being irradiated on the flow channel 21 to form a light channel 101 at the flow channel 21 for detecting the particles 100;

an optical signal collecting and processing module 3, the optical signal collecting and processing module 3 is configured to acquire scattered optical signals formed by the particles 100 passing through the light channel 101, to convert the scattered optical signals into corresponding pulse signals, to compensate the pulse signals, and to screen and count the pulse signals.

In the present embodiment, the light source module 1 comprises a semiconductor laser for generating a laser beam and a collimating lens disposed between the semiconductor laser and the flow cell module 2. The laser beam is collimated by the collimating lens and then irradiated on the flow channel 21 to form a cylindrical light channel 101 perpendicular to the flow channel 21 at the flow channel 21. An optical density of the light channel 101 is normally distributed.

The optical signal collecting and processing module 3 comprises a photoelectric detector 31, a preamplifier 32, an Analog to Digital converter sampling unit 33, and a micro control unit 34 connected in sequence. The photoelectric detector 31 is used to convert the optical signals scattered by the particles 100 into current pulse signals, and in the present embodiment, the photoelectric detector 31 has a photodiode or a photomultiplier. The preamplifier 32 is used to convert the current pulse signals into voltage pulse signals. The Analog to Digital converter sampling unit 33 is used to convert the voltage pulse signals into digital signals. The micro control unit 34 is used to compensate, to screen and to count the digital signals.

A particle counting method utilizing the particle counting system of the present disclosure is as follows:

A particle counting method, comprises:

S1) opening the light source module 1 to generate a light channel 101 on the flow channel 21 for detecting the particles 100, the light channel 101 is perpendicular to paths through which the particles 100 flow, and an optical density of the light channel 101 is normally distributed in a plane perpendicular to the paths through which the particles 100 flow, and a distribution curve 103 of the optical density is shown in FIG. 6. The optical density distribution function is:

$$I = \rho w_0 \exp\left(-k\frac{r^2}{w_0^2}\right) \quad (1)$$

wherein, $w_0$ is an optical density at the center of the light channel; $\rho$ and $k$ are corresponding coefficients, and $r$ is a distance to the center of the light channel 101.

S2) acquiring voltage pulse signals corresponding to optical signals scattered by the particles 100 passing through the light channel 101, specifically, S21) acquiring the optical signals scattered by the particles 100 via the photoelectric detector 31 and converting the optical signals into current pulse signals;

S22) converting the current pulse signals into voltage pulse signals via the preamplifier 32;

S23) converting the voltage pulse signals into digital signals via the Analog to Digital converter sampling unit 33.

S3) according to the voltage pulse signals, in the micro control unit 34, obtaining distances between closest positions to center of the light channel 101 in paths along which the particles 100 pass through the light channel 101 and the center 104 of the light channel 101, specifically, S31) obtaining flow times of the particles 100 passing through the light channel 101 according to pulse widths of the voltage pulse signals due to that pulse widths of the voltage pulse signals are correlated with times that the particles 100 pass through the light channel 101, and when the particles 100 pass through the light channel 101 in a speed $v_0$, the pulse widths of the voltage pulse signals, i.e., the flow times are $t_0$, S32) obtaining flow paths of the particles 100 flowing through the light channel 101 according to flow velocities $v_0$ and the flow times $t_0$ of the particles 100, lengths of which are:

$$L1 = v_0 \times t_0 \quad (2)$$

S33) calculating first distances r1 between closest positions 102 and center 104 of the light channel 101, positions closest to the center 104 of the light channel 101 in the flow path are the closest positions 102, and due to the light channel 101 is circle shaped in the plane perpendicular to the flow paths 21, a radius thereof is R, $$r1 = \sqrt{R^2 - \left(\frac{L1}{2}\right)^2} = \sqrt{R^2 - [(v_0 t_0)/2]^2} \quad (3)$$

then,

S4) according to the optical density distribution curve 103 of the light channel 101, compensating amplitudes of the pulse signals of the particles 100 when the particles 100 pass through the closest positions to the center 104 of the light channel 101 in the paths along which the particles 100 pass through the light channel 101, such that the compensated amplitudes of the pulse signals of the particles 100 are equal to amplitudes of pulse signals of particles 100 with the same particle diameters when passing through the center 104 of the light channel 101, specifically:

S41) pulse voltage amplitudes of the particles 100 at the closest positions 102 measured by the particle counting system is initial pulse voltage amplitudes V1, and $$V1 = Mg \times \Phi1 = Mg \times S1 \times I1 \quad (4),$$

wherein, Mg is a product of an amplification factor of the preamplifier 32 and a photoelectric conversion efficiency of the photoelectric detector 31, $\Phi1$ is a luminous flux generated by the particles 100 passing through the closest position 102, and S1 is an equivalent area of a scattered light generated by the particles 100, and I1 is an optical density at the closest position 102, center pulse voltage amplitudes V0 of the particles 100 passing through the center 104 of the light channel are:

$$V0 = Mg \times \Phi0 = Mg \times S1 \times I0 = Mg \times S1 \times \rho \times w_0 \quad (5);$$

wherein, $\Phi0$ is a luminous flux generated by the particles 100 passing through the center 104 of the light channel 101, I0 is an optical density at the centers, $\rho$ is a corresponding coefficient, and $w_0$ is an optical density at the center 104 of the light channel 101.

S42) The compensated pulse voltage amplitudes are pulse voltage amplitudes of the particles 100 at the closest positions 102 after compensation, and calculating, according to the first distances and an optical density distribution function, compensation coefficients f of the initial pulse voltage amplitudes required to be compensated, $$f = \frac{V0}{V1} = \frac{I0}{I1} = \frac{\rho \times w_0}{\rho \times w_0 \times \exp\left(-k\frac{r_1^2}{w_0^2}\right)} = \exp\left(k\frac{r_1^2}{w_0^2}\right) = \exp\left(k\frac{\left[R^2 - \left(\frac{v_0 \times t_0}{2}\right)^2\right]}{w_0^2}\right). \quad (6)$$

S43) Obtaining compensated pulse voltage amplitudes V of the particles 100 according to the compensation coefficient f.

$$V = f \times V1 = \exp\left(k\frac{\left[R^2 - \left(\frac{v_0 \times t_0}{2}\right)^2\right]}{w_0^2}\right) \times V1. \quad (7)$$

S5) Screening and counting the particles 100 according to the compensated pulse signal amplitudes V to realize counting of particles 100 with respective particle sizes.

After compensation, it can ensure to obtain the same optical density as passing through the center 104 of the light channel 101 when the particles 100 enter into the light channel 101 at any angle, which greatly improves the sensitivity of the particle counting system and the utilization of the laser beam.

The particle counting method does not require a complicated optical path structure, and utilizes the optical density distribution function of the light source module 1 to compensate the light scattering signal by detecting the time $t_0$ of the particles passing through the light channel 101, to achieve that the particles of the same size passing through the light channel 101 at any position can generate detectable signals of the same amplitude, which ensures that the acquired pulse signals corresponding to the particles 100 are only related to the particle sizes of the particles 100, and thus can screen and count the particles of different particle sizes according to the pulse signals.

The particle counting system has a simple optical path structure, greatly improves sensitivity and resolution of the detection, is suitable for detecting gas-phase and liquid-phase insoluble particles, reduces the processing difficulty of the flow cell module 2, and improves the utilization rate of the light source module 1.

As above described, the present disclosure is explained according to the purpose thereof, but the present utility model is not limited to the above-mentioned embodiments and implement methods. Various variations and implementations can be made by the practitioners of the relative technical fields within the technical concept of the present disclosure.

The invention claimed is:

1. A particle counting method, is characterized in that, it comprises following steps:

S1) generating a light channel for detecting particles, the light channel is associated with a circular spot, and an optical density of the light channel is normally distributed in a section perpendicular to the paths through which the particles flow; the optical density distribution function I is as shown in the following formula (1):

$$I = \rho w_0 \exp\left(-k\frac{r^2}{w_0^2}\right) \quad (1)$$

wherein, $w_0$ is an optical density at a center of the light channel; $\rho$ and k are coefficients, and r is a distance to the center of the light channel from paths along which the particles pass through the light channel;

S2) acquiring optical signals scattered by the particles passing through the light channel and converting the optical signals into pulse signals;

S3) according to the pulse signals, obtaining distances between closest positions which are positions closest to the center of the light channel in the paths along which the particles pass through the light channel and the center of the light channel;

S4) according to an optical density distribution of the light channel, compensating amplitudes of the pulse signals of the particles when passing through the closest positions such that compensated amplitudes of the pulse signals of the particles are equal to amplitudes of pulse signals of particles with same particle diameters when passing through the center of the light channel:

S41) the initial pulse voltage amplitudes V1 are as shown in the following formula (4):

$$V1 = Mg \times \Phi1 = Mg \times S1 \times i1 \quad (4)$$

wherein, Mg is a product of an amplification factor of the preamplifier and a photoelectric conversion efficiency of the photoelectric detector, $\Phi1$ is a luminous flux generated by the particles passing through the closest position, and S1 is an equivalent area of a scattered light generated by the particles, and I1 is an optical density at the closest position;

center pulse voltage amplitudes V0 of the particles passing through the center of the light channel are as shown in the following formula (5):

$$V0 = Mg \times \Phi0 = Mg \times S1 \times I0 = Mg \times S1 \times \rho \times w_0 \quad (5)$$

wherein, $\Phi0$ is a luminous flux generated by the particles passing through the center of the light channel, I0 is an optical density at the centers, $\rho$ is a corresponding coefficient, and $w_0$ is an optical density at the center of the light channel;

S42) compensation coefficients f are as shown in the following formula (6):

$$f = \frac{V0}{V1} = \quad (6)$$

$$\frac{I0}{I1} = \frac{\rho \times w_0}{\rho \times w_0 \times \exp\left(-k\frac{r_1^2}{w_0^2}\right)} = \exp\left(k\frac{r_1^2}{w_0^2}\right) = \exp\left(k\frac{\left[R^2 - \left(\frac{v_0 \times t_0}{2}\right)^2\right]}{w_0^2}\right);$$

S43) compensated pulse voltage amplitudes V are as shown in the following formula (7), where V is associated with the compensated amplitudes of the pulse signals of the particles:

$$V = f \times V1 = \exp\left(k\frac{\left[R^2 - \left(\frac{v_0 \times t_0}{2}\right)^2\right]}{w_0^2}\right) \times V1. \quad (7)$$

S5) screening and counting the particles according to the compensated amplitudes of the pulse signals to realize counting of the particles with respective particle sizes.

2. The particle counting method according to claim 1, is characterized in that, the light channel is perpendicular to paths through which the particles flow.

3. The particle counting method according to claim 2, is characterized in that, the optical density distribution function I is as shown in the following formula (1):

$$I = \rho w_0 \exp\left(-k\frac{r^2}{w_0^2}\right) \quad (1)$$

wherein, $w_0$ is an optical density at the center of the light channel; p and k are the coefficients, and r is a distance to the center of the light channel.

4. The particle counting method according to claim 1, is characterized in that, in the step S2), the pulse signals are voltage pulse signals.

5. The particle counting method according to claim 4, is characterized in that, the step S2) specifically comprises:

acquiring the optical signals scattered by the particles via a photoelectric detector and converting the optical signals into current pulse signals;

converting the current pulse signals into voltage pulse signals via a preamplifier.

6. The particle counting method according to claim 5, is characterized in that, the step S3) specifically comprises:

obtaining flow times of the particles passing through the light channel according to pulse widths of the voltage pulse signals;

obtaining flow paths of the particles flowing through the light channel according to flow velocities and the flow times of the particles;

obtaining the distances between the closest positions and the center of the light channel.

7. The particle counting method according to claim 6, is characterized in that, the distance r1 is as shown in the following formula (3):

$$r1 = \sqrt{R^2 - \left(\frac{L1}{2}\right)^2} = \sqrt{R^2 - [(v_0 t_0)/2]^2} \quad (3)$$

wherein, R is a circular radius of the light channel presenting in a section perpendicular to the flow path, and a flow path length L1 of the particle flowing through the light channel is as shown in the following formula (2):

$$L1 = v_0 \times t_0 \quad (2)$$

wherein, v0 is a flow velocity of the particle, $t_0$ is a flow time.

8. The particle counting method according to claim 6, is characterized in that, the step S4) specifically comprises:

pulse voltage amplitudes of the particles at the closest positions are initial pulse voltage amplitudes, and pulse voltage amplitudes of the particles at the closest positions after compensation are compensated pulse voltage amplitudes; calculating compensation coefficients of the initial pulse voltage amplitudes required to be compensated according to the distances and an optical density distribution function, obtaining the compensated pulse voltage amplitudes of the particles according to the compensation coefficient.

9. A particle counting system, is characterized in that, utilizing the particle counting method according to claim 1, comprises:

a light source module for generating a light beam for detecting the particles;

a flow cell module having a flow channel through which the particles flows, the light beam being irradiated on the flow channel to form a light channel at the flow channel for detecting the particles;

an optical signal collecting and processing module configured to acquire scattered optical signals formed by the particles passing through the light channel, to convert the scattered optical signals into corresponding pulse signals, to compensate the pulse signals, and to screen and count the pulse signals.

10. The particle counting system according to claim 9, is characterized in that, the light source module comprises a semiconductor laser for generating a laser beam irradiated on the flow channel to form the light channel at the flow channel which is perpendicular to the flow channel.

11. The particle counting system according to claim 10, is characterized in that, the light source module further comprises a collimating lens disposed between the semiconductor laser and the flow cell module, and the laser beam is collimated by the collimating lens and then is irradiated on the flow channel to form a cylindrical light channel on the flow channel, and an optical density of the light channel is normally distributed.

12. The particle counting system according to claim 9, is characterized in that, the optical signal collecting and processing module comprises a photoelectric detector, a preamplifier, an Analog to Digital converter sampling unit, and a micro control unit connected in sequence, the photoelectric detector is used to convert the optical signals scattered by the particles into current pulse signals;

the preamplifier is used to convert the current pulse signals into voltage pulse signals;

the Analog to Digital converter sampling unit is used to convert the voltage pulse signals into digital signals;

the micro control unit is used to compensate, to screen and to count the digital signals.

13. The particle counting system according to claim 12, is characterized in that, the photoelectric detector comprises a photodiode or a photomultiplier.

\* \* \* \* \*